Figure 1:
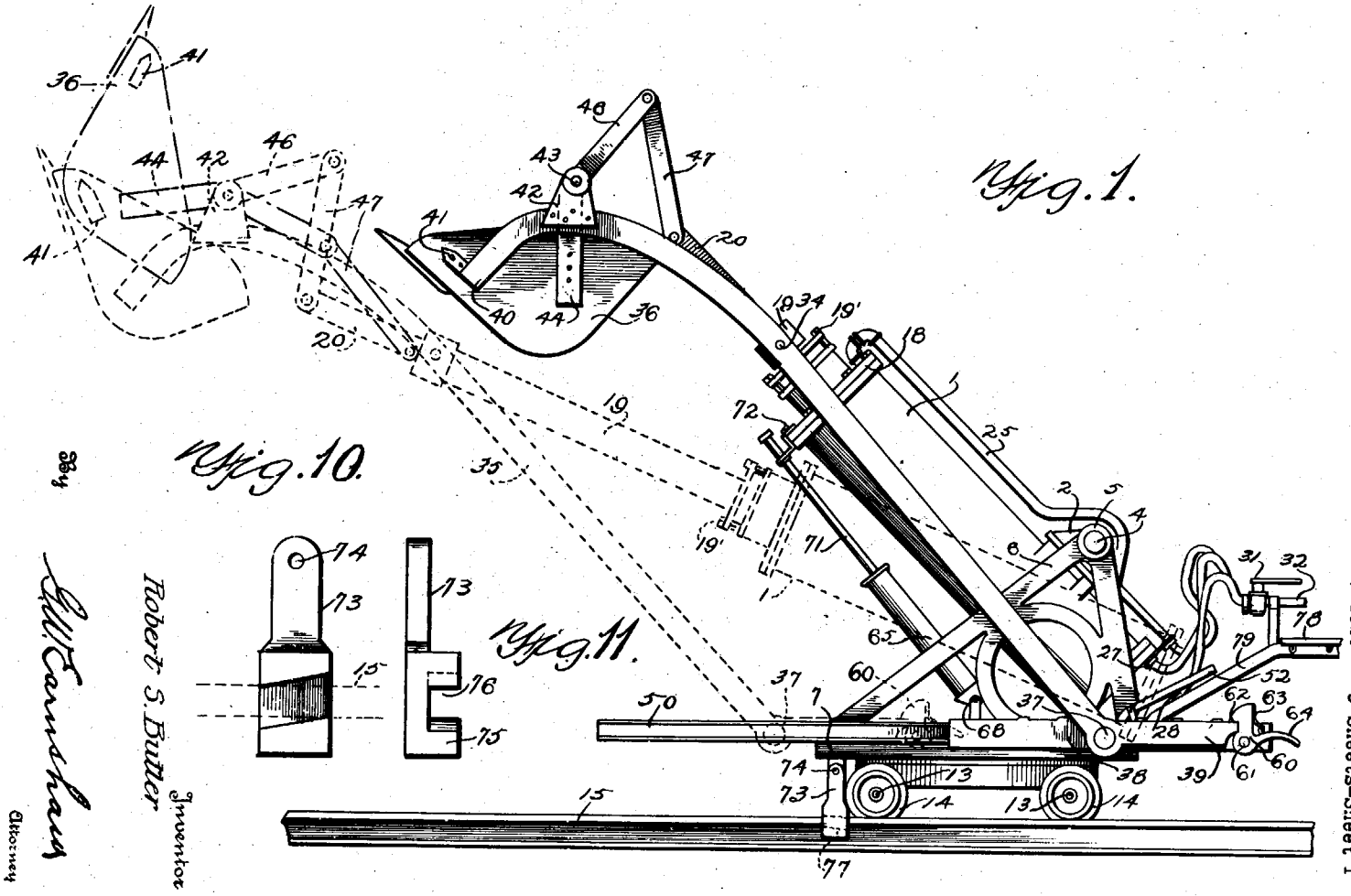

Nov. 18, 1924.

Re. 15,950

R. S. BUTLER

MINE SHOVEL

Original Filed Oct. 11, 1920 5 Sheets-Sheet 1

Inventor

Robert S. Butler

By G. W. Earnshaw

Attorney

Nov. 18, 1924. Re. 15,950

R. S. BUTLER

MINE SHOVEL

Original Filed Oct. 11, 1920 5 Sheets-Sheet 2

Inventor

Robert S. Butler

By G. W. Earnshaw

Attorney

Nov. 18, 1924.

Re. 15,950

R. S. BUTLER

MINE SHOVEL

Original Filed Oct. 11, 1920 5 Sheets-Sheet 3

Inventor
Robert S. Butler

By G. W. Earnshaw
Attorney

Nov. 18, 1924.

R. S. BUTLER

Re. 15,950

MINE SHOVEL

Original Filed Oct. 11. 1920 5 Sheets-Sheet 4

Inventor
Robert S. Butler

G. W. Earnshaw
Attorney

Nov. 18, 1924. Re. 15,950
R. S. BUTLER
MINE SHOVEL
Original Filed Oct. 11, 1920 5 Sheets-Sheet 5
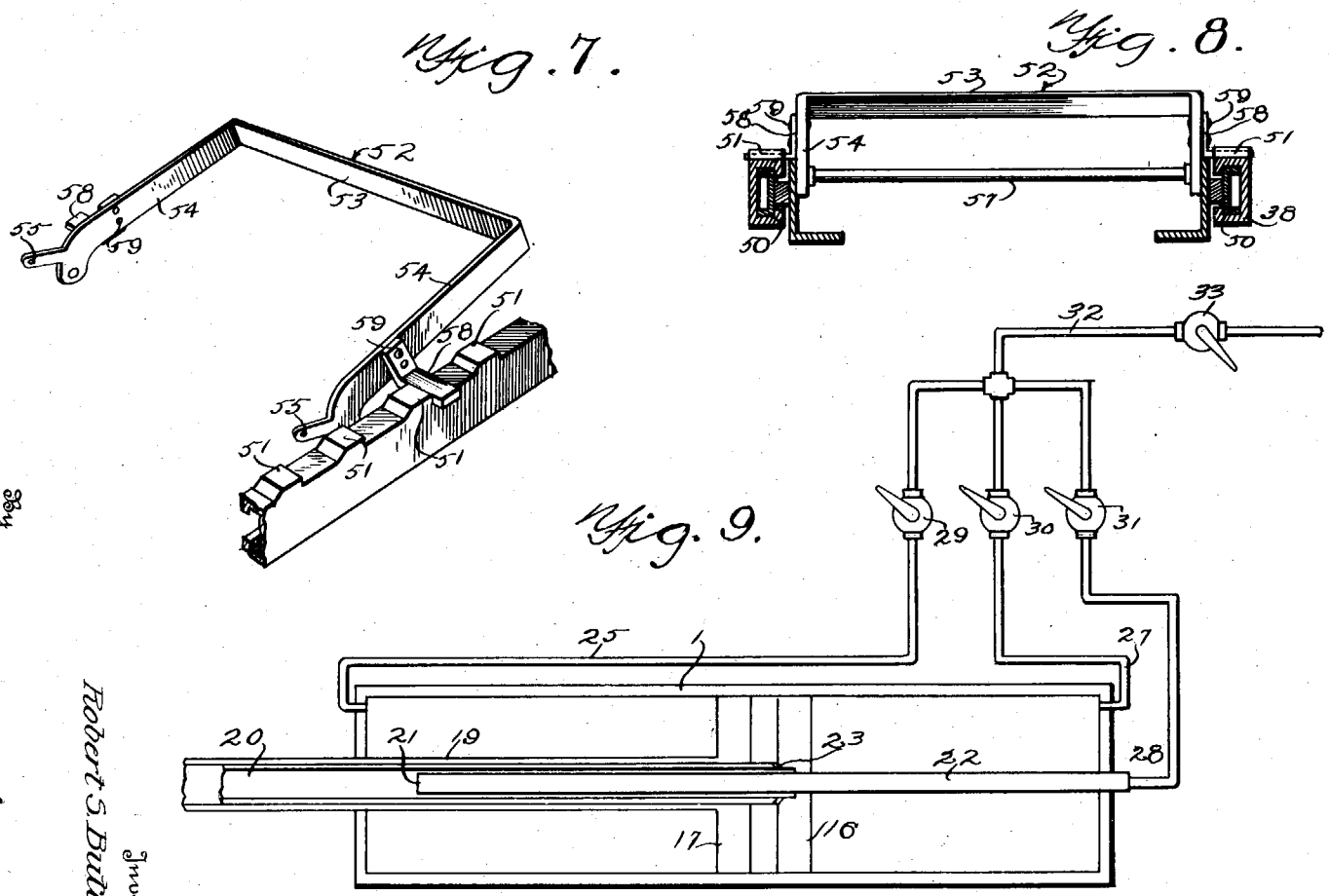
Inventor
Robert S. Butler
By G. W. Earnshaw Attorney Reissued Nov. 18, 1924. Re. 15,950

UNITED STATES PATENT OFFICE.

ROBERT S. BUTLER, OF JOPLIN, MISSOURI.

MINE SHOVEL.

Original No. 1,504,427, dated August 12, 1924, Serial No. 416,175, filed October 11, 1920. Renewed June 20, 1924. Application for reissue filed October 13, 1924. Serial No. 743,504.

*To all whom it may concern:*

Be it known that I, ROBERT S. BUTLER, a citizen of the United States, residing at Joplin, in the county of Jasper and State of Missouri, have invented certain new and useful Improvements in Mine Shovels, of which the following is a specification.

This invention relates to mine shovels, and it comprises a suitable support, a cylinder pivotally mounted thereon, a pair of pistons mounted in said cylinder, piston rods secured to said pistons, a shovel or dipper pivotally attached to the outer extension of one of said piston rods, the other piston rod being connected to said shovel to actuate it on its pivot, guides connected to said first mentioned piston rod to travel therewith and normally cause said shovel to travel in a horizontal plane, and means for locking said guides to prevent movement thereof and cause the cylinder to swing on its pivot when the pistons are actuated.

In the prior art, there are disclosed various constructions of shoveling and loading machines for underground use. Devices of this character must be capable of digging as well as loading to be satisfactory. Several machines have been developed which are capable of being employed for loading coal, broken rock or the like, onto tram cars after it has been mined or dug by hand. These machines have not been generally adopted for the reason that they do not sufficiently eliminate hand work and are therefore not satisfactory.

A machine of this sort to be entirely satisfactory must be flexible and must be capable of loading cars in substantially any relative position. Various machines have been constructed which are satisfactory in some respects, but which can load a car only when the car is in one certain position with reference to the digging and loading machine. The amount of space for trackage in a mine is very limited and the restriction imposed by this weakness of some types of mine shovels is a very serious one, as it necessitates an undue amount of hand shoveling to keep the drift clean.

A device of this sort must be mobile, as it is of the utmost importance that the shovel be so constructed that it can instantly and constantly be moved forward into the work and quickly moved back or into a fresh place without appreciable loss of time. A shovel of great weight consisting of an unnecessary amount of machinery is incapable of being moved quickly and is therefore unsatisfactory.

The present invention is unique in this respect, that should the dipper become inert when on the forward movement and partly filled with dirt or rock, air is admitted to the front end of the cylinder which causes the machine to move forward to its work until that inertia is overcome; or, by reason of the novel features in the elevating mechanism, the dipper may be withdrawn to starting position without being elevated. The machine is comparatively light in weight, compact in form, strong and durable with a flexibility that is impossible in any machine now in use.

In the present invention, I have produced a mining shovel that is operated by compressed air or other fluid, eliminating mechanically operated moving parts in mesh with each other, such as gearing and the like, which have proved unsatisfactory due to the excessive wear of the parts because of deposition of dust and grit during operation. The machine is very simple, comprising a single pivotally mounted cylinder having a pair of pistons therein. By introducing the compressed air or fluid at the rear end of the cylinder, the pistons may be moved outwardly in a horizontal line to cause the shovel to engage the face or bank to be cut. When the shovel has been moved forwardly a sufficient distance, air is admitted to the space between the pistons and the shovel is swung on its pivot, causing the digging opration.

The dipper may be elevated whenever desired, but preferably on the middle third of the forward movement of the piston by means of a latching system which causes the power admitted to the forward end of the cylinder to swing the cylinder in an arc of a circle. After the cylinder is elevated, to elevate the shovel, suitable latching mechanism is automatically brought into locking position to maintain the dipper in elevated position and to permit the longitudinal movement and the dumping thereof. The dumping operation is accomplished by the same mechanism which is employed to enable the dipper to dig.

The entire machine is mounted on a turntable whereby the shovel may be swung in a circle to either side or to the rear after being elevated, to empty the contents into any suitable receptacle, such as a car.

Figures 2, 3:
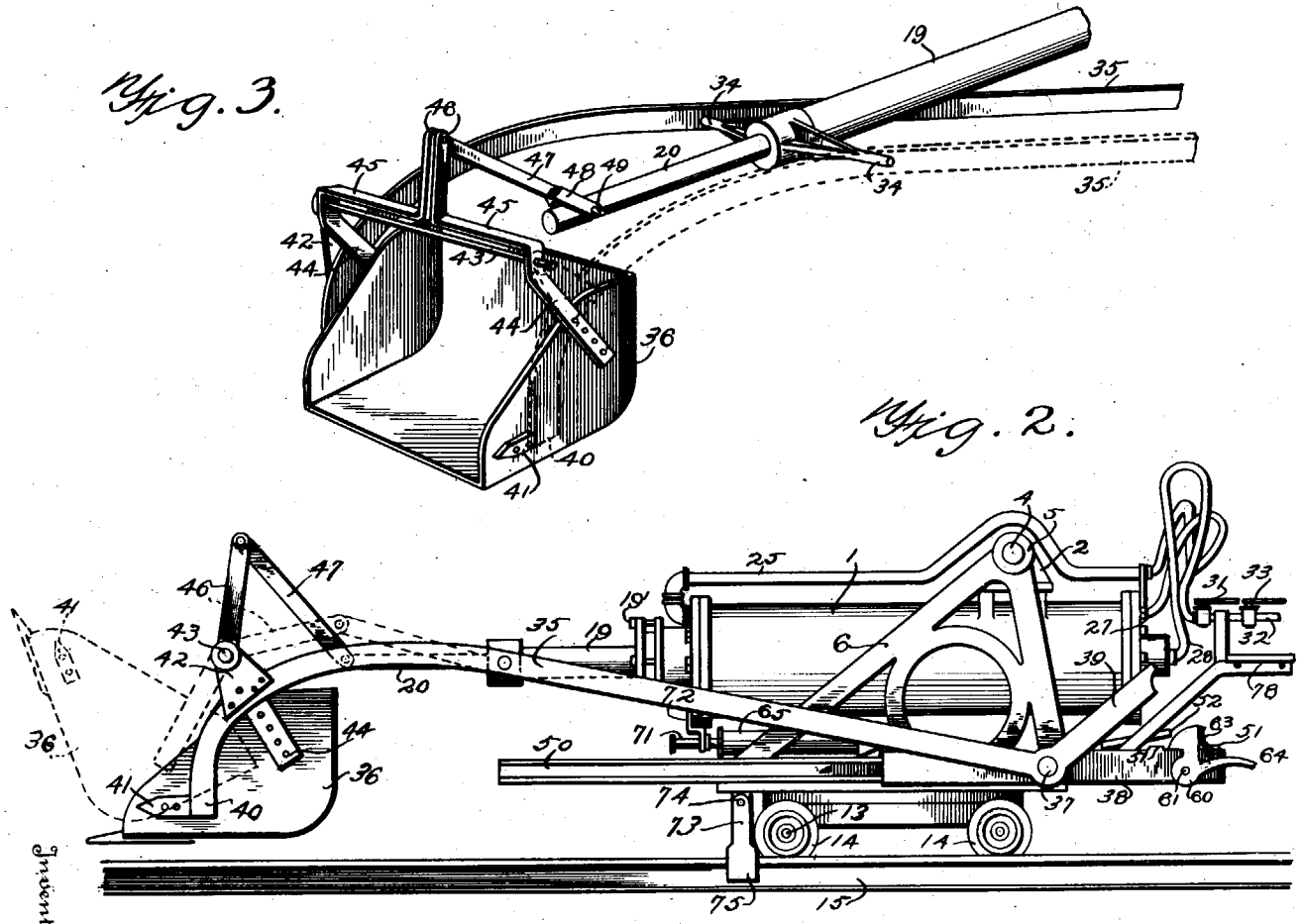
Figure 4:
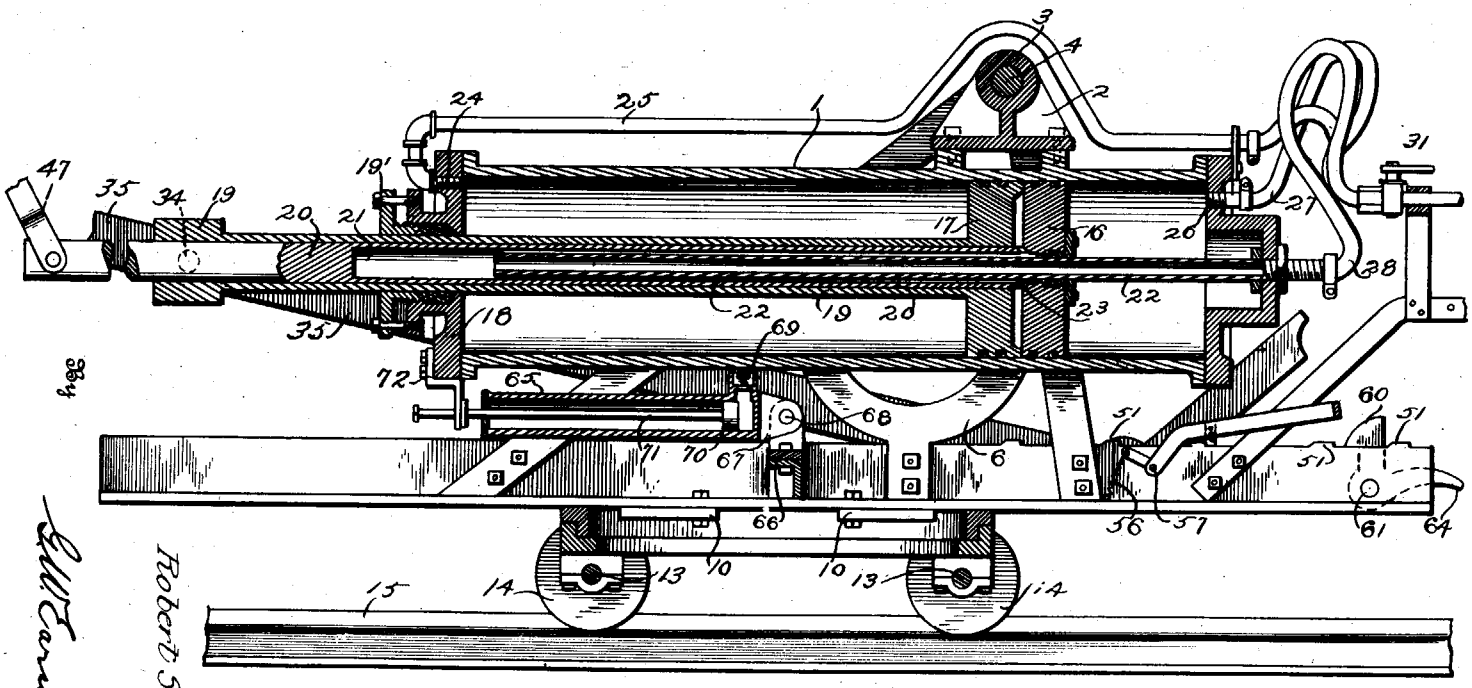
Figure 5:
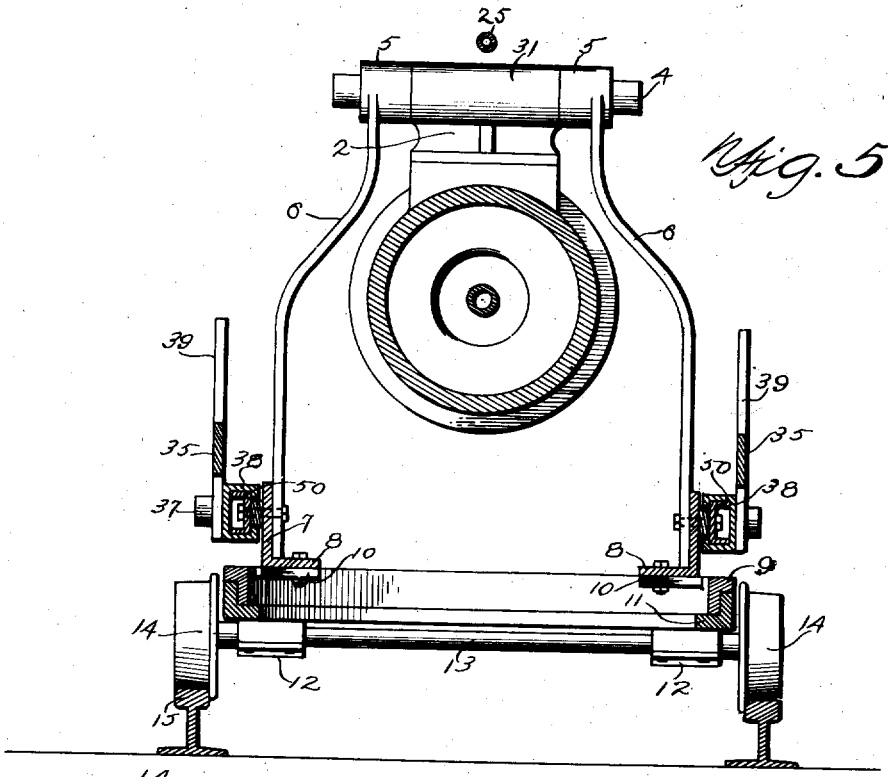
Figure 6:
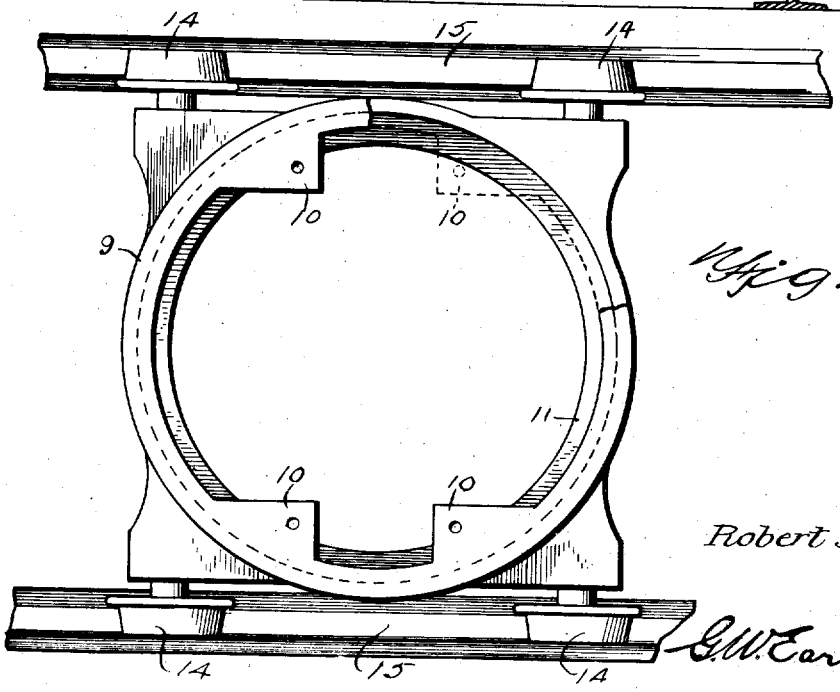

In the accompanying drawings, I have shown one embodiment of the invention. In this showing:

Figure 1 is a side elevation of the machine showing the cylinder in elevated position and showing the parts in extreme reaching position, also the dipper in dumping position, in dotted lines, Figure 2 is a similar view showing the cylinder in horizontal position, Figure 3 is a detail perspective view of the shovel showing the manner in which it is pivoted, Figure 4 is a central longitudinal sectional view through the cylinder, Figure 5 is a vertical transverse sectional view of the machine, Figure 6 is a plan view of the turn-table, Figure 7 is a detail view of the latching mechanism, Figure 8 is a transverse sectional view of the cross head and guide connected to the piston rods, Figure 9 is a diagrammatic view showing the manner of controlling the inlet of fluid to the cylinders, Figure 10 is a side elevation of a track engaging means to prevent the device from moving rearwardly, and, Figure 11 is an end elevation thereof.

Referring to the drawings, the reference numeral 1 designates a cylinder to which is secured a bracket 2 carrying a sleeve 3. A rod or shaft 4 passes through the sleeve and this rod is received in bearings 5 carried by uprights 6 secured to the frame of the machine. It will be apparent that the cylinder is pivoted with respect to the frame of the machine and may be arranged either in horizontal position as shown in Figure 2, or at an incline, as shown in Figure 1. Vertical supporting members 6 are secured to angular plates 7 having horizontal portions 8. The horizontal portions of the angular members are secured to the movable member 9 of a turn-table, said member being provided with enlargements 10 for the reception thereof. The turn-table includes a base 11 adapted to receive the movable member 9, and suitable bearings 12 are arranged on the turn-table for the reception of axles 13. Wheels 14 are mounted on the axles whereby the device may be moved on tracks 15. Referring in detail to Figure 4 of the drawings, a pair of pistons 16 and 17 is arranged within the cylinder. These pistons are provided with piston rods projecting through the forward head 18 of the cylinder, the cylinder head being provided with suitable packing 19′, if desired. The forward piston is provided with a hollow piston rod 19 and the rear piston is provided with a piston rod 20, arranged within the hollow piston rod and extending beyond the same. An opening 21 is arranged in the inner piston rod and a pipe 22 is extended into this opening. The pipe extends through the rear piston and passes through an opening in the rear cylinder head. As shown, the inner piston rod is provided with a plurality of ports 23 to permit communication between the opening 21 and the interior of the cylinder between the pistons. The forward head of the cylinder is provided with an inlet 24 to which fluid under pressure is conveyed by pipe 25. The rear cylinder head is provided with a similar opening 26, having a pipe 27 connected thereto. The pipe 22 extends through the rear cylinder head and is connected to a pipe 28.

Referring to Figure 9 of the drawings, the feed pipes 25, 27 and 28 are provided with three-way valves 29, 30 and 31, respectively, to control the admission of fluid to the ends of the cylinder or to the space between the pistons, and to permit exhaust from the cylinder to the atmosphere. Beyond the valves, these pipes are connected to a common supplying pipe 32, provided with a valve 33 to control the flow of air or fluid.

The outer piston rod 19 is adapted to control the forward, rearward and elevating movements of the shovel. As shown, this rod is provided with a pair of transverse rods 34 arranged adjacent its outer ends. A pair of beams 35 is secured to the two transverse beams and a shovel 36 is carried by these beams. The rear ends of the beams are pivotally mounted, as at 37, on a pair of guides 38. Beyond the pivot, the beams are provided with angular extensions 39. The forward ends of the beams are curved downwardly, as at 40, and are adapted to engage a pair of cleats 41, arranged on the sides of the shovel when the shovel is in normal position. A pair of brackets 42 is secured to the beams in line with each other and these brackets are adapted to support a transverse rod 43. The bucket is secured to a pair of arms 44, pivotally supported on the transverse rod 43, each of the arms being provided with transverse portions 45, having links 46 arranged thereon. The links 46 are disposed adjacent each other and the connecting link 47 is secured to the outer ends of the links. The other end of the connecting link is forked, as at 48, and is provided with openings for the reception of a pin 49, which passes through the inner piston rod 20.

The guide members 38 to which the longitudinal beams are secured may be made channel shape, as shown, and these members with the beams form a cross head adapted to reciprocate on the corresponding members 50, carried by the frame of the machine. The members 38 are provided with a plurality of studs or projections 51 on their upper faces. A latching member 52 is secured to the frame of the machine and is adapted to cooperate with the projections 51 to lock the guides in any given position and prevent longitudinal movement thereof. As shown, the latching member comprises a transverse portion 53 having a pair of longitudinal arms 54 arranged at each side. These arms are provided with extensions 55 having openings therein for the reception of the ends of coil springs 56 to normally maintain the latching member in inoperative position. The opposite ends of the springs are secured to any suitable part of the frame of the machine. As shown, the latching member is pivotally supported on a transverse rod 57 (see Figure 4). A latch 58 is secured to each of the longitudinal arms of the latching member, as at 59, and when the latching member is depressed by the operator, the latch 58 engages one of the studs 51 to prevent longitudinal movement of the guides 38. When the latching member is in operative position and fluid under pressure is supplied to the forward end of the cylinder, the power exerted swings the cylinder on its pivot from the position illustrated in Figure 2 of the drawings to the position shown in full lines of Figure 1 of the drawings. As the cylinder assumes an inclined position, the angular extensions 39 of the beams assume a horizontal position adjacent the guides 38. Each of the guides 38 is provided with a locking member 60, pivoted on the guides, as at 61, and having a lip or projection 62 adapted to engage the angular members 39 when it assumes a horizontal position. A spring 63 is arranged in engagement with the locking member to maintain it in operative position. The locking member is provided with an extension 64 whereby it may be released.

The cylinder is provided with cushioning mechanism whereby it may be gradually lowered from the position shown in full lines in Figure 1 of the drawings to its normal horizontal position when the lock 60 is released. A cylinder 65 is pivotally mounted in a bracket 66, carried by the frame of the machine. As shown, the cylinder is provided with ears 67 adapted to receive a pivot pin 68, arranged in the bracket. The cylinder is provided with a spring pressed valve 69, the valve being arranged to oppose the exhaust of fluid from the cylinder. A piston 70 is arranged in the cylinder, the piston being carried by a piston rod 71. The outer end of the piston rod is secured to a bracket 72 carried by the main cylinder. When the forward end of the main cylinder is elevated, as shown in Figure 1 of the drawings, the piston in the cylinder 65 moves outwardly, as shown. When the lock 60 is released, the inward movement of the piston 70 is retarded by the air in the cylinder and the valve 69 permits the air to flow from the cylinder very slowly so that the main cylinder is lowered gradually and without shock.

Means are provided to prevent rearward movement of the frame of the shovel when in operative position. A rail gripping member 73 is pivoted to a bracket on the under side of the frame as at 74 and this member is provided with an enlargement 75 at its lower end. An inclined slot 76 is arranged in this enlargement, the slot slanting downwardly from its forward end to provide a sharp shoulder 77 at the rear end of the rail gripper, which will grip the rail 15 in operative position and prevent rearward movement of the machine. The machine may be moved forwardly at all times.

An operator's seat 78 is arranged on the frame 79 at the back of the machine. The seat is so arranged that the operator may reach the ground with his feet to swing the machine on its turn-table or to propel the machine along the tracks, and the various control valves 29, 30, 31 and 33 are positioned near the operator's seat. The latching member 52 is so arranged that the operator may conveniently place his foot on the cross bar 53 to operate it.

The operation of the machine is as follows:

The machine is first positioned with the cylinder horizontal, as shown in Figure 2, and with poth pistons at the rear end of the cylinder. The operator propels the machine along the track until it reaches the bank or drift to be cut by pushing along the ground with his feet. Air is then admitted to the cylinder through pipe 27 by opening valve 30, the valve 33 having been previously opened. The dipper or shovel is moved forwardly in a line parallel to the ground. This forward motion of the dipper is referred to in the art as "crowding" or "creeping". When the dipper has been moved forwardly a sufficient distance, the supply of compressed air or fluid to the rear end of the cylinder is cut off by closing the valve 30. The bucket may be reversed and caused to move backward, if desired, by admitting air to the forward end of the cylinder through pipe 25. This is accomplished by opening valve 29. The digging operation is performed by admitting energy between the two pistons. The valve 31 is opened to supply fluid to pipe 28, whence it passes to pipe 22, and to the space 21 in the interior of the inner piston rod. From the interior of the piston rod, the fluid passes through openings 23 into the cylinder between the pistons. This causes the pistons to move apart and draws the inner piston rod 20 rearwardly, moving the bucket from the position indicated in full lines in Figure 2 of the drawings, to the position indicated in dotted lines. The connecting link 47 and the dipper supporting members 44 and 46 cause the bucket to rotate on rod 43, describing an arc of a circle. This is the digging operation and tends to fill the dipper and to throw any particles into the dipper that might otherwise escape. After the dipper has been filled, it may be moved rearwardly by admitting air or other fluid to the forward end of the cylinder or it may be elevated.

To elevate the dipper, the latch 52 is lowered, and the latching member 58 engages one of the lugs 51 on the cross head 38. Air is then admitted to the forward end of the cylinder through pipe 25, and the pistons being restrained from rearward movement by the beams 35 connected to the cross head and to the piston rod 19, the cylinder is swung in the arc of the circle to the position shown in Figure 1. When the angular extensions 39 of the beams assume a horizontal position, the locking members 60 engage the ends thereof, and the operator may then release his foot from the latching member, the cylinder then being maintained in elevated position. After the dipper has been elevated, it may be swung on the turntable by the operator to bring it into position to empty its contents into a car disposed on either side or to the rear of the machine. While in elevated position, the dipper may be moved by admitting fluid to either end of the cylinder. When in the position shown in Figure 1 of the drawings with the latch released, the cross heads 38 are not restrained from longitudinal movement but the beams 37 are maintained at an angle by the locking member 60. With the parts in the position shown in full lines in Figure 1 of the drawings, if air is admitted to the rear end of the cylinder, the pistons will be moved outwardly as indicated in dotted lines and the cross heads 38 will be moved on the guides 50. As the pistons are moved either forwardly or rearwardly with the beams locked, the angle of the cylinder will change but the dipper will neither be raised nor lowered.

When the bucket is arranged in proper position over the car, the contents may be emptied by admitting energy to the center of the cylinder through pipe 28 and swinging the dipper on its pivot in the manner heretofore described.

When the machine is positioned with respect to the bank or drift to be cut, the rail gripping members 73 are arranged in position to prevent the machine from moving rearwardly. During operation, the machine is moved forwardly into the drift from time to time by the operator, the operator propelling the machine along the tracks with his feet. When the machine is to be moved to a new location, the rail gripping members 73 are swung upwardly to inoperative position.

Valves 29, 30 and 31 are ordinary three way valves, adapted to be arranged in one position to permit communication between the pipe 32 and the pipes 25, 27 and 28, respectively, in a second position to permit communication between the pipes 25, 27 and 28 and the atmosphere, and in a third position to disconnect the pipes 25, 27 and 28 from the source of supply or from the atmosphere.

It will be apparent that I have provided a very simple apparatus for digging and loading coal or other material in underground work where the amount of space is limited and where a small machine is desired.

In the present machine, the parts are so arranged that the weight of the loaded dipper is not sufficient to offset the weight of the machine and cause it to turn over. In order to secure proper counterbalancing with a machine of light weight, the operator's seat is arranged in such position that the weight of the operator is added to the weight of the mechanism which must be overcome by the loaded dipper. When the weight of the machine alone is not sufficient to counterbalance the weight of the loaded dipper, then by placing the operator's seat at the rear of the machine, sufficient counterbalancing has been provided to offset any weight that the dipper may be expected to lift.

The machine is extremely flexible and any of the various operations may be stopped at any time and another started. There is no complete cycle in which single operations have to be completed before another is started. When the dipper is being moved forwardly, it can be instantly reversed or elevated. The digging operation may be performed at any time and the shovel may be moved rearwardly in a horizontal plane after digging or may be instantly elevated. After elevation, the shovel may be moved forwardly or rearwardly, or the entire device may be revolved on the turn-table. The dipper may be rotated at any time to dump it.

The arrangement of the two pistons in a single cylinder in which the two pistons and piston rods act as a single unit at all times except at digging and dumping, is advantageous in that the number of parts is greatly reduced and the weight of the mechanism is reduced. When moving in a horizontal plane, the dipper is always resting on the ground so that the force for the digging operation is less than in other types of machines.

It is to be understood that while I have described the preferred embodiment of my invention, various changes in the shape, size, and arrangement of parts may be resorted to without departing from the spirit of the invention or the scope of the subjoined claims.

Having thus described my invention, I claim:

1. A mine shovel comprising a cylinder, a pair of pistons mounted therein, piston rods secured to each of said pistons, and a pivotally mounted shovel connected to one of said rods to control its forward and rearward movement, the other piston rod being connected to said shovel to swing it on its pivot.

2. A mine shovel comprising a cylinder, a pair of pistons mounted therein, piston rods secured to each of said pistons, a pair of beams secured to one of said piston rods, a shovel pivotally mounted on said beams, and connections between said other piston rod and said shovel.

3. A mine shovel comprising a cylinder, a pair of pistons mounted therein, piston rods secured to each of said pistons, a pivotally mounted shovel connected to one of said rods to control its forward and rearward movement, the other piston rod being connected to said shovel to swing it on its pivot, means for moving said pistons as a unit, and means for moving each of said pistons independently of the other.

4. A mine shovel comprising a cylinder, a pair of pistons mounted therein, piston rods secured to each of said pistons, a pivotally mounted shovel connected to one of said rods to control its forward and rearward movement, the other piston rod being connected to said shovel to swing it on its pivot, and means for swinging said cylinder in a vertical plane to elevate said shovel.

5. A mine shovel comprising a frame, a cylinder support mounted on said frame and capable of independent rotation with respect thereto, a cylinder carried by said support, a pair of pistons mounted therein, piston rods secured to each of said pistons, and a pivotally mounted shovel connected to one of said rods to control its forward and rearward movement, the other piston rod being connected to said shovel to swing it on its pivot.

6. A mine shovel comprising a frame, a cylinder pivotally mounted on said frame, a pair of pistons mounted therein, piston rods secured to said pistons, a pivotally mounted shovel connected to one of said rods, the other piston rod being connected to said shovel to swing it on its pivot, and means for swinging said cylinder on its pivot.

7. A mine shovel comprising a frame, a cylinder pivotally mounted on said frame, a pair of pistons mounted therein, piston rods secured to said pistons, a pivotally mounted shovel connected to one of said rods, the other piston rod being connected to said shovel to swing it on its pivot, means for swinging said cylinder on its pivot, means for moving said pistons as a unit, and means for moving each of said pistons independently of the other.

8. A mine shovel comprising a frame, a cylinder support mounted on said frame and capable of rotation with respect thereto, a cylinder pivotally mounted on said support, a pair of pistons mounted therein, piston rods secured to said pistons, a pivotally mounted shovel connected to one of said rods, the other piston rod being connected to said shovel to swing it on its pivot, and means for swinging said cylinder on its pivot.

9. A mine shovel comprising a frame, a cylinder pivotally mounted on said frame, a pair of pistons mounted therein, piston rods secured to said pistons, a pair of beams secured to one of said piston rods, a shovel pivotally mounted on said beams, connections between said second piston rod and said shovel, and means for swinging the cylinder on its pivot.

10. A mine shovel comprising a frame, a cylinder pivotally mounted on said frame, a pair of pistons mounted therein, piston rods secured to said pistons, a pair of beams connected to one of said piston rods, a shovel pivotally mounted on said beams, the other piston rod being connected to said shovel to swing it on its pivot, and means for locking said beams to prevent rearward longitudinal movement of said beams.

11. A mine shovel comprising a frame, a cylinder pivotally mounted on said frame, a pair of pistons mounted therein, piston rods secured to said pistons, a pair of beams connected to one of said piston rods, a shovel pivotally mounted on said beams, the other piston rod being connected to said shovel to swing it on its pivot, means for locking said beams to prevent rearward longitudinal movement of said beams, means for moving said pistons as a unit, and means for moving said pistons independently of each other.

12. A mine shovel comprising a frame, a cylinder pivotally mounted on said frame, a pair of pistons mounted therein, piston rods secuured to said pistons, a pair of beams secured to one of said piston rods, a shovel pivotally mounted on said beams, a pair of guides mounted on the frame, cross heads slidably mounted on said guides, said beams being pivoted thereto, and connections between the other piston rod and shovel.

13. A mine shovel comprising a frame, a cylinder pivotally mounted on said frame, a pair of pistons mounted therein, piston rods secured to said pistons, a pair of beams secured to one of said piston rods, a shovel pivotally mounted on said beams, a pair of guides mounted on the frame, cross heads slidably mounted on said guides, said beams being pivoted thereto, connections between the other piston rod and shovel, and means for locking said cross heads to said guides to prevent rearward longitudinal movement thereof.

14. A mine shovel comprising a frame, a cylinder pivotally mounted on said frame, a pair of pistons mounted therein, piston rods secured to said pistons, a pair of beams secured to one of said piston rods, a shovel pivotally mounted on said beams, a pair of guides mounted on the frame, cross heads slidably mounted on said guides, said beams being pivoted thereto, connections between the other piston rod and shovel, and means for locking said cross heads to said guides to prevent rearward longitudinal movement thereof to permit said cylinder to be moved to an inclined position, and means for locking said cylinder in inclined position.

15. A mine shovel comprising a frame, a cylinder pivotally mounted on said frame, a pair of pistons mounted therein, piston rods secured to said pistons, a pair of beams secured to one of said piston rods, a shovel pivotally mounted on said beams, a pair of guides mounted on the frame, cross heads slidably mounted on said guides, said beams being pivoted thereto, connections between the other piston rod and shovel, means for moving said pistons as a unit, and means for moving said pistons independently of each other.

16. A mine shovel comprising a frame, a cylinder pivotally mounted on said frame, a pair of pistons mounted therein, piston rods secured to said pistons, a pair of beams secured to one of said piston rods, a shovel pivotally mounted on said beams, a pair of guides mounted on the frame, cross heads slidably mounted on said guides, said beams being pivoted thereto, connections between the other piston rod and shovel, means for locking said cross heads to said guides to prevent rearward longitudinal movement thereof, means for moving said pistons as a unit, means for moving said pistons independently of each other, and means for moving said shovel forward and rearward in elevated position.

17. A mine shovel comprising a frame, a cylinder pivotally mounted on said frame, a pair of pistons mounted therein, piston rods secured to said pistons, a pair of beams secured to one of said piston rods, a shovel pivotally mounted on said beams, a pair of guides mounted on the frame, cross heads slidably mounted on said guides, said beams being pivoted thereto, connections between the other piston rod and shovel, means for locking said cross heads to said guides to prevent rearward longitudinal movement thereof to permit said cylinder to be moved to an inclined position, means for locking said cylinder in inclined position, means for moving said shovel forward and rearward in elevated position, means for moving said pistons as a unit, and means for moving said pistons independently of each other.

18. A mine shovel comprising a support, a pair of reciprocating members mounted thereon, means for reciprocating said members independently of each other or in unison, and a pivotally mounted shovel connected to one of said members to control its forward and rearward movement, the other member being connected to said shovel to swing it on its pivot.

In testimony whereof, I affix my signature.

ROBERT S. BUTLER.